Figure 1:
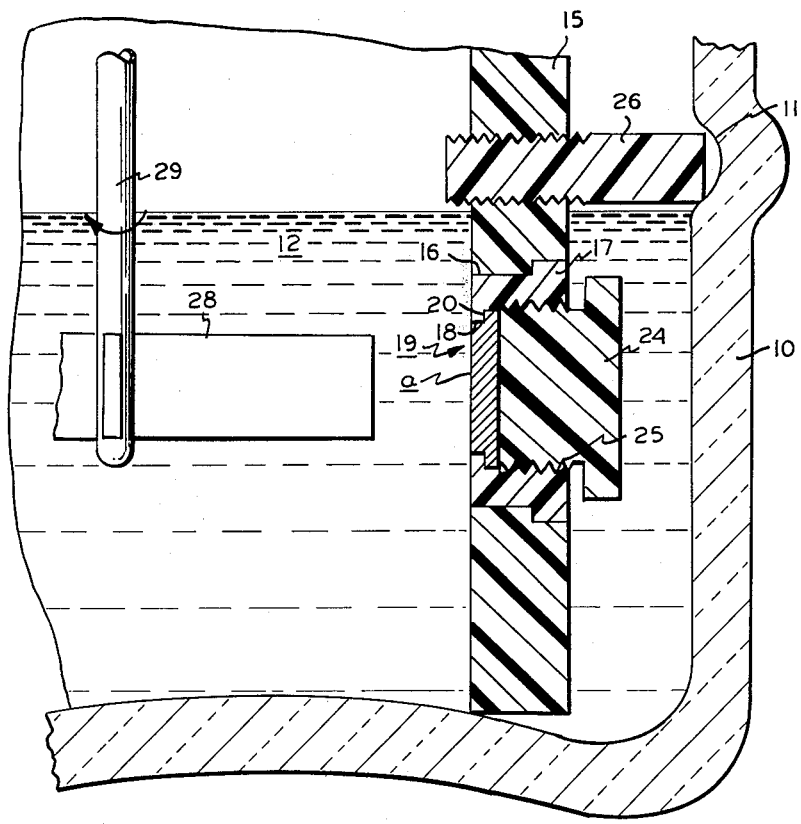

Jan. 11, 1966     R. J. LANDRUM ETAL     3,228,236

APPARATUS FOR CORROSION-EROSION TESTING

Filed April 19, 1962     2 Sheets-Sheet 1

INVENTORS
ROBERT J. LANDRUM
JOHN TETI, SR.

BY *Harry J. McCauley*

ATTORNEY

United States Patent Office 3,228,236
Patented Jan. 11, 1966

3,228,236
APPARATUS FOR CORROSION-EROSION TESTING
Robert J. Landrum, Wilmington, and John Teti, Sr., New Castle, Del., assignors to E. I. du Pont de Nemours and Company, Wilmington, Del., a corporation of Delaware
Filed Apr. 19, 1962, Ser. No. 188,703
1 Claim. (Cl. 73—86)

This invention relates to a method and apparatus for corrosion-erosion testing of materials of construction exposed to corrosive fluids, and particularly to a method and apparatus for corrosion-erosion testing simulating, to a very high degree, exposure conditions existing within the interiors of pipes, pipe elbows, pump casings, vessels provided with agitators, and the like.

It has been found that there is a very decided effect on corrosion rate of such factors as corrosive fluid flow rate, manner of fluid flow and essential duplicability of other conditions existing within pipe lines and similar equipment subjected to fluid scouring in the determination of the resistance of materials of construction to exposure to corrosive fluids. The importance of advance corrosion-erosion tests is, of course, critical, since extremely costly fabrication work and early failure of equipment under corrosive attack can both be avoided if a completely reliable basis for materials of construction comparison is available. Certain test procedures have been hitherto suggested, such as those taught in U.S. Patents 2,274,541 and 2,519,323; however, in both of these reliance is placed on test samples which are themselves rotated, which is inconvenient and, more important, not a dependable simulation of conditions existing within pipe lines but, rather, applicable to pump rotors or similar equipment parts. Moreover, neither of the patented constructions teach the controlled movement of the test fluid in steady uniform tangential flow across the entire face of the sample in test, which latter is highly important to attainment of a uniform corrosion-erosion effect over the whole sample area as well as to acceptable quantitative reproducibility in test results.

Figure 2:
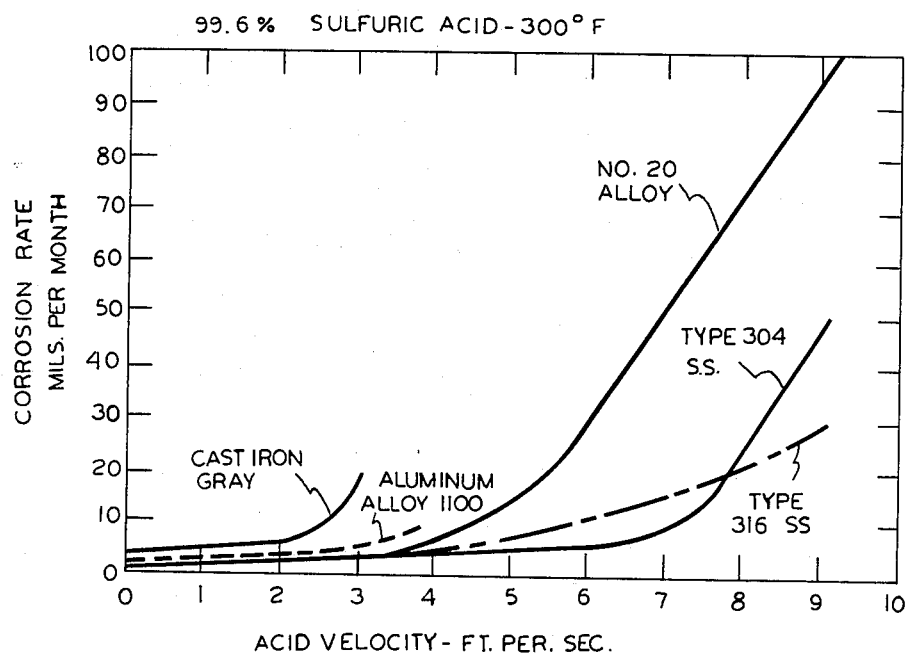

An object of this invention is the provision of an improved method and apparatus for corrosion-erosion testing of materials exposed to flowing corrosive fluids. Another object of this invention is the provision of a method and apparatus for corrosion-erosion testing which utilizes small size samples of uncomplicated shape, one which permits the simultaneous testing of a plurality of samples exposed in common to the corrosive environment, and one which is compact in space requirements and inexpensive in first cost and costs of operation and maintenance. The manner in which these and other objects of this invention are attained will become clear from the following detailed description and the drawings, in which:

FIG. 1 is a cross-sectional side elevational view of a preferred embodiment of apparatus according to this invention shown in half representation, and FIG. 2 is a plot of comparative corrosion-erosion test data for a number of metals and alloys tested for corrosion-erosion resistance to 99.6% $H_2SO_4$ at a temperature of 300° F. with the apparatus of FIG. 1.

Generally, this invention consists of a method and apparatus for testing the corrosion-erosion resistance of solid materials by subjecting stationary samples of the materials to the sweep of fluid in flow substantially tangentially to a face of the samples under the propulsion of a rotary impeller disposed at a substantially constant radial distance from the sample, and determining the degree of deterioration of the samples as a function of the weight loss occurring during exposure to the fluid.

Referring to FIG. 1, the apparatus can conveniently comprise a glass beaker or similar heat-resistant vessel 10 provided with an internal circumferential groove 11, which vessel is adapted to hold the test fluid, indicated generally as occupying the space 12.

The sample holder consists of an annulus or ring 15 fabricated from extremely corrosion-resistant material, such as, for example, polytetrafluoroethylene resin or the like. The holder is provided with a plurality of radially disposed shouldered ports 16 which are adapted to receive the mating individual specimen holders 17 (also corrosion-resistant), retained in position by corrosion-resistant screws, not shown. The inside faces of sample holders 17 are drilled to a bore 18 receiving in snug frictional fit the inside length of the specimen slug, indicated generally at 19, whereas the outward length is provided with a somewhat larger bore, providing an internal shoulder 20 against which the enlarged end of the specimen abuts in leak-tight insertion within holder 15. The specimen is further locked in place by a threaded corrosion-resistant screw cap 24 engaging tightly within the rear threaded bore 25 of the holder, sealing off the back face of the specimen against corrosive fluid leakage from the outside of ring 15.

As indicated in the drawing, specimens 19 are simply circular pieces machined with a peripheral shoulder abutting shoulder 20, of such a thickness that the face $a$ exposed to the corrosive test fluid is substantially co-extensive with the inside face of holder 17 and also of ring 15. Typically, the specimens can have a small (inner) diameter of 1", a large (outer) diameter of 1⅛", and a thickness of ¼", with the shoulder disposed at the half-thickness dimension.

It is preferred to space the ring holder 15 rather precisely circumferentially, and this is accomplished with externally extending positioning screws 26 disposed at three or more equiangular spacings around the periphery of holder 15, the outboard ends of the screws seating in groove 11.

A typical apparatus employed a ring holder 15 of 6" outside diameter, 5" inside diameter, and a height of 5½". This easily supported eight specimens on the same vertical level one with another in circular array confronting the stirrer 28, which was a four-bladed glass paddle direct-driven from a variable speed electric motor, not shown, by vertical glass shaft 29. The paddle blades measured ¾" wide and had a length measured from the center line of shaft 29 to the outward extremity of 2", thus clearing the faces $a$ of specimens 19 by precisely ½". The arrangement was such that the plane of sweep of the center lines of the blades of stirrer 28 coincided with the radially oriented central axes of the specimens in test, so that full symmetry in fluid sweep across the specimen faces was obtained during stirrer rotation.

If desired, more than one holder 15 can be successively superimposed in a stack arrangement on another in order to enlarge the testing capacity of a single apparatus proportionately, in which case paddle blade sets 28 are spaced along the length of shaft 29, so that one set exclusively services a single holder 15 and its eight specimens.

It will be understood that the apparatus and method of this invention are equally applicable to testing with gaseous or liquid fluids, as well as slurries or other solids-fluid combinations which possess fluid-like flow properties. Temperature control is readily achieved by encasing vessel 10 within an electrical heating mantle, not detailed, controlled thermostatically by a conventional temperature controller provided with a temperature-sensitive element immersed in fluid 12 held by the vessel.

The conduct of a test simply involves weighing the samples beforehand, mounting them within holder 15 with screw plugs 24 screwed in firmly, adding the preheated corrosive fluid and then switching on the drive motor, so that a test exposure of predetermined duration is had, after which the samples are removed, rinsed, dried and reweighed to obtain the weight loss attributable to combined corrosion and erosion. It will be understood that corrosive attack by the test fluid is confined solely to the faces $a$ of specimens 19, thereby simulating pipe line surface and elbow exposures and the like occurring in plant practice very faithfully. Ordinarily, stirring is accomplished at a steady rate providing a constant velocity test fluid sweep across the faces $a$ of specimens 19 closely approaching the fluid velocities which are to be preserved in service. If desired, cyclic patterns of changing fluid velocity can, of course, be readily achieved during the test if the service exposures are to be simulated in this detail.

The results of typical corrosion-erosion tests conducted with the apparatus hereinbefore detailed are plotted in FIG. 2, the test fluid being, in this instance, 99.6% $H_2SO_4$ maintained at a temperature of 300° F.

As shown, corrosion rate in mils per month calculated from the weight loss measured at typical velocities, e.g., 1 and 2 ft./sec., respectively, for gray cast iron, is plotted as ordinate against acid sweep velocities as abscissas. The important bearing of test fluid velocity on corrosion-erosion resistance is at once apparent from FIG. 2 and, for the particular installation in design, a considerable economic saving was achieved by selecting type 304 stainless steel as the material of construction, taking care, however, that all piping was sized to limit fluid sweep velocities to below about 6 ft./sec.

From the foregoing, it will be understood that this invention can be modified extensively within the skill of the art without departure from its essential spirit, and it is therefore intended to be limited only within the scope of the appended claim.

What is claimed is:

Apparatus for measuring the corrosion-erosion effects of a fluid on a solid material comprising, in combination, a vessel capable of holding a quantity of said fluid, a power-driven rotary impeller submerged in said fluid, and an annular sample holder fabricated from material having a high resistance to corrosion and erosion by said fluid disposed substantially concentric with said rotary impeller, said annular sample holder being provided with bores disposed substantially radially of said rotary impeller receiving samples of said solid material with inward faces aligned substantially flush with the inside periphery of said sample holder.

References Cited by the Examiner
UNITED STATES PATENTS

| | | | |
|---|---|---|---|
| 2,414,439 | 1/1947 | Brandon | 73—7 |
| 2,484,279 | 10/1949 | Folz | 73—86 |
| 2,519,323 | 8/1950 | Shank et al. | 73—86 |
| 2,856,495 | 10/1958 | Chittum et al. | |
| 3,149,574 | 9/1964 | Mill | 103—114 |

RICHARD C. QUEISSER, *Primary Examiner.*

DAVID SCHONBERG, *Examiner.*

Dedication 3,228,236.—*Robert J. Landrum*, Wilmington, and *John Teti, Sr.*, New Castle, Del. APPARATUS FOR CORROSION-EROSION TESTING. Patent dated Jan. 11, 1966. Dedication filed Mar. 19, 1969, by the assignee, *E. I. du Pont de Nemours and Company.*

Hereby dedicates to the Public the entire term of said patent.

[*Official Gazette July 8, 1969.*]